United States Patent [19]

Clewlow et al.

[11] Patent Number: 5,427,999
[45] Date of Patent: Jun. 27, 1995

[54] AMINE ADDUCTS AS CORROSION INHIBITORS

[75] Inventors: Paul J. Clewlow, Faringdon; John A. Haslegrave; Niall Carruthers, both of Abingdon, all of England; Daniel S. Sullivan, III; Brent Bourland, both of Houston, Tex.

[73] Assignee: Exxon Chemical Patents Inc., Linden, N.J.

[21] Appl. No.: 882,848

[22] Filed: May 14, 1992

[30] Foreign Application Priority Data

Jun. 28, 1991 [GB] United Kingdom ............... 9114012

[51] Int. Cl.⁶ .............................................. C23F 11/14
[52] U.S. Cl. ........................ 507/241; 252/389.61; 252/389.62; 252/392; 422/16; 208/47; 507/246; 507/265; 507/939
[58] Field of Search ............... 252/8.555, 396, 389.61, 252/389.62, 392; 562/571, 553; 560/171; 422/16; 208/47

[56] References Cited

U.S. PATENT DOCUMENTS

| | | | |
|---|---|---|---|
| 3,278,478 | 10/1966 | Masterson et al. | 252/8.555 |
| 3,445,441 | 5/1969 | Rushton | 252/8.555 |
| 3,510,282 | 5/1970 | Seffens | 252/392 |
| 4,315,087 | 2/1982 | Redmore et al. | 252/8.555 |
| 4,547,224 | 10/1985 | Schilling | 252/311.5 X |
| 5,068,416 | 11/1991 | Baur et al. | 562/571 |

*Primary Examiner*—Robert L. Stoll
*Assistant Examiner*—Valerie Fee
*Attorney, Agent, or Firm*—R. L. Graham

[57] ABSTRACT

Amines which are compounds of the formula I:

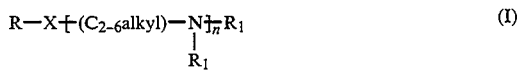

where
R is a $C_{6-20}$ hydrocarbon;
X is $-NR_1-$ or $-O-$;
each $R_1$ is independently H or $-[(CH_2)_{1-4}]COOH$ or a $C_{6-20}$ hydrocarbon;
n is 1, 2 or 3;

and which contains at least one $(CH_2)_{1-4}COOH$ group; or salt thereof are useful in inhibiting corrosion of metals in a marine or freshwater environment e.g. in oil- and gas-field applications since they show relatively low toxicity to marine organisms.

12 Claims, No Drawings

AMINE ADDUCTS AS CORROSION INHIBITORS

Application Ser. No. 882,833, filed May 14, 1992 (now U.S. Pat. No. 5,300,235) discloses a low toxic corrosion inhibitor having a different formula than that used in the present invention.

The present invention relates to the, use of compounds and compositions as corrosion inhibitors in situations where they may come into contact with the natural environment e.g. by discharge of produced water, and to a method of inhibiting corrosion using these materials.

In order to preserve metals, and particularly ferrous metals, in contact with corrosive liquids in gas-and oil-field applications, corrosion inhibitors are added to many systems, e.g. cooling systems, refinery units, pipelines, steam generators and oil production units. A variety of corrosion inhibitors are known. For example, GB-A-2009133 describes the use of a composition which comprises an aminecarboxylic acid such as dodecylamine propionic acid, and a nitrogen-containing compound containing an organic hydrophobic group, such as N-(3-octoxypropyl)-propylenediamine.

EP-A-256802 describes a method of inhibiting corrosion of metal surfaces in contact with a corrosive hydrocarbon-containing medium comprising contacting the metal surfaces with the reaction product of (a) tallow triamine or tallow tetraamine and (b) an acrylic acid type compound, in which the ratio of the two reagents is preferably 1:1.

Although corrosion inhibitors of many types are known, the materials which have been found most effective in practice have the disadvantage of toxicity to the environment. Toxicity to the marine or freshwater environment is of particularly concern. In gas and oil field applications, much work is done off-shore or on the coast. If a corrosion inhibitor enters the sea or a stretch of fresh water, then, even at relatively low concentrations, the corrosion inhibitor can kill microorganisms, causing an imbalance in the environment. Attempts have therefore been made to identify materials which are successful corrosion inhibitors but at the same time are less toxic to the environment than known inhibitors. The applicants have found that adducts of a fatty amine and an unsaturated acid in which the product contains no primary amino groups, and only secondary or tertiary, more preferably tertiary, amino groups has a lower toxicity to the environment (referred to as ecotoxicity).

The present invention therefore provides use as a corrosion inhibitor in a marine or freshwater environment of an amine which is a compound of the formula I:

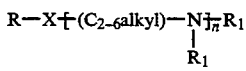

(I)

where
R is a $C_{6-20}$ hydrocarbon;
X is $-NR_1-$ or $-O-$;
each $R_1$ is independently H or $-[(CH_2)_{1-4}]COOH$ or a $C_{6-20}$ hydrocarbon;
n is 1, 2 or 3;
and which contains at least one $(CH_2)_{1-4}COOH$ group; or salt thereof.

The present invention also provides a method of inhibiting corrosion of a metal by a liquid in a marine or freshwater environment which comprises providing in the liquid an amine as defined above.

It has been found that the amines defined above have favourable ecotoxicity levels in marine or freshwater environments. The ecotoxicity decreases with increasing substitution on the N atoms present i.e. it appears that tertiary groups are less toxic than secondary groups which are in turn less toxic than primary groups. Preferably therefore each amino group is secondary or tertiary, more preferably tertiary.

Use in a marine or freshwater environment is intended to mean use in an environment in which the corrosion inhibitor in normal usage is likely to come into contact with an area of seawater or freshwater.

In the amine of the present invention the hydrocarbon group or groups of from 6 to 20 carbon atoms may be straight or branched, saturated or unsaturated, and may be aliphatic or may contain one or more aromatic groups. Preferably the hydrocarbon group is straight chain aliphatic and is saturated, optionally with up to 20% of the chains being unsaturated. Preferably the, hydrocarbon contains 12 to 20 carbon atoms, more preferably 16 to 20 carbon atoms. It is preferred that R is the hydrocarbon residue of a naturally occurring fatty acid, which is optionally hydrogenated e.g. the residue of caproic, caprylic, capric, lauric, myristic, palmitic, stearic, palmitoleic, oleic, linoleic or linolenic acid. The amines used in the present invention can conveniently be formed by the reaction of a fatty amine and an unsaturated acid in which case R corresponds to the fatty part of the amine. Fatty amines are readily available in which the fatty portion is a mixture of hydrocarbon groups. For example, the amine, diamine or triamine of hydrocarbon residues of coconut oil or tallow oil are readily available.

In the amine of formula I it is preferred that X is $-NR_1-$, since such compounds have been found to be more effective at inhibiting corrosion than the corresponding ethers.

When $R_1$ is a hydrocarbon it may be the residue of a naturally occurring fatty acid as described above for R, or it may be an artificially synthesised hydrocarbon. If $R_1$ is a hydrocarbon, it is preferably a residue of a naturally occurring fatty acid.

However, $R_1$ is preferably H or $-[(CH_2)_{1-4}]COOH$. As indicated above, it is preferred that each amino group is a tertiary group, i.e. $R_1$ is $-[(CH_2)_{1-4}]COOH$. The alkyl group may be straight chain or branched. Conveniently the compound of formula I is produced by adding acrylic acid to a fatty amine, which results in a compound in which $R_1$ is $-CH_2CH_2COOH$.

The $C_{2-6}$alkyl group linking the fatty hydrocarbon and amino groups in the compound of formula I may be straight or branched. Conveniently it is a propylene or hexylene group since the starting amines are either available commercially or can be readily synthesised.

The amine of formula I may contain 1, 2, 3 or 4 amino groups. It is preferred for it to contain 2 amino groups since the tests carried out so far suggest that such compounds provide the optimum in terms of ease of production and handling, good corrosion inhibition properties and low ecotoxicity. Diamine compounds correspond to compounds of the formula I in which X is $-NR_1-$ and n is 1.

The amine may be present in the form of a salt, for example an alkali metal salt such as sodium or potassium, an alkaline earth metal salt such as magnesium or calcium, or an ammonium salt.

Preferred amines include those of formula II:

  (II)

in which tallow indicates the residue of an acid found in beef tallow, and each $R_1$ is independently H or —($C_{2-4}$alkyl) COOH and $R_2$ is —$(CH_2)_{1-4}$COOH and salts thereof. Preferably $R_1$ is —$[(CH_2)_{1-4}]$COOH, conveniently $CH_2CH_2COOH$. Conveniently $R_2$ is $CH_2CH_2COOH$. Thus a particularly preferred compound is of formula III:

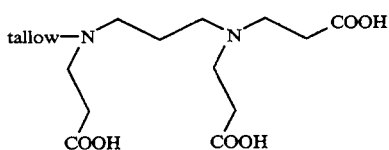 (III)

Compounds of the formula I in which $R_1$ is H, a $C_{6-20}$ hydrocarbon or —$[(CH_2)_{2-4}]$COOH may conveniently be produced by reacting an amine of the formula IV

 (IV)

where R, X and n are as defined above and $R_1$ is H or a $C_{6-20}$ hydrocarbon, with an acid of formula V $$CH_2=CR'—(CHR')_m—COZ \quad (V)$$

in which m is 0, 1 or 2, each R' is hydrogen or when m is 1, R' may be methyl, and Z is OH or alkyl. To produce a compound in which $R_1$ is H, a $C_{6-20}$ hydrocarbon, or —$[(CH_2)_{1-4}]$COOH, the amine of formula IV may be reacted with a chloro acid of formula VI

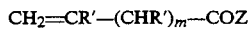 (VI)

The molar ratio of acid of formula V or VI to amine of formula IV should be chosen to ensure the desired level of substitution takes place. Typically therefore to avoid the presence of primary amino groups the molar ratio will be at least 2:1, more preferably 3:1 when the starting amine contains two amino groups, at least 3:1, more preferably 4:1 when the starting amine is a triamine and so on. A slight molar excess (e.g. about 10%) of acid is generally used, e.g. for a diamine the acid may be used in a molar ratio of about 3.3:1.

Preferably the compounds of formula I are made by reacting the compounds of formulae IV and V since if the chloro acid is used as a starting material, it is generally difficult to remove all the chlorine-containing material from the product, and chlorine-containing compounds can damage the environment. Preferably the acid is acrylic acid.

The reaction of acrylic acid with the primary amine yields predominantly the β-amino propionic acid derivative directly. Depending on the distance between the amino group and the acid group, the product may be a cyclic internal salt.

The reaction may be carried out by heating a solution of the amine in a suitable solvent, conveniently an alcohol such as isobutanol or isopropanol or water. The required quantity of the acid is gradually introduced. The temperature at which the reaction is carried out is generally from 50° C. upto the reflux temperature of the reaction mixture, typically 60° to 100° C.

The compounds tend not to be soluble in water or brine, but are dispersible to some extent in water.

The amine may be used as a corrosion inhibitor in the form of a solution or dispersion in water and/or an organic solvent. Examples of suitable solvents are alcohols such as methanol, ethanol, isopropanol, isobutanol, glycols and aliphatic and aromatic hydrocarbons. The solubility of the compounds in water can be improved by forming a salt with e.g. sodium, potassium or magnesium.

The amount of active ingredient in the compounds required to achieve sufficient corrosion protection varies with the system in which the inhibitor is being used. Methods for monitoring the severity of corrosion in different systems are well known, and may be used to decide the effective amount of active ingredient required in a particular situation.

In general, it is envisaged that the amines will be used in amounts of upto 1000 ppm, but typically within the range of 1 to 200 ppm.

The amines may be used in combination with known corrosion inhibitors,, although to achieve the low ecotoxicity which is desirable, it is preferred that only corrosion inhibitors which have low ecotoxicity are used.

The amines may be used in compositions which contain other materials which it is known to include in corrosion inhibiting compositions e.g. scale inhibitors and surfactants. In some instances it may be desirable to include a biocide in the composition.

The compositions may be used in a variety of areas in the gas and oil industry. They can be used in primary, secondary and tertiary oil recovery and be added in a manner known per se. They can also be incorporated in water-soluble capsules which are introduced in the wells and when the capsules dissolve the inhibitor is slowly released into the corrosive fluid. Another technique in primary oil recovery where they can be used is the squeeze treating technique, whereby they are injected under pressure into the producing formation, are adsorbed on the strata and desorbed as the fluids are produced. They can further be added in the water flooding operations of secondary oil recovery as well as be added to pipelines, transmission lines and refinery units.

The following examples illustrate the invention.

METHOD

A solution of the appropriate starting amine in isopropyl alcohol (50% based on the total amount of reactants to be used) was heated to 60° C. with stirring under nitrogen. The requisite quantity of acrylic acid was then added dropwise. After addition had been completed, the reaction temperature was raised to 85° C. and maintained at this temperature for 10 hours. Clear, pale yellow-coloured solutions resulted. Table 1 sets out the starting amines and amounts of acid used to form the adducts.

TABLE 1

| EXAMPLE | STARTING AMINE | MOLAR RATIO OF AMINE TO ACRYLIC ACID |
| --- | --- | --- |
| 1 | Coco-1,3-diaminopropane[a] | 1:1.1 |
| 2 | Coco-1,3-diaminopropane | 1:2.2 |
| 3 | Coco-1,3-diaminopropane | 1:3.3 |
| 4 | Tallow-1,3-diaminopropane[b] | 1:1.1 |
| 5 | Tallow-1,3-diaminopropane | 1:2.2 |

TABLE 1-continued

| EXAMPLE | STARTING AMINE | MOLAR RATIO OF AMINE TO ACRYLIC ACID |
|---|---|---|
| 6 | Tallow-1,3-diaminopropane | 1:3.3 |

[a] Sold as Duomeen C by Akzo
[b] Sold as Duomeen T by Akzo

CORROSION INHIBITION TESTS

Corrosion inhibition was measured using an LPR bubble test.

The LPR "bubble test" apparatus consists of several 1 liter cylindrical Pyrex glass vessels. Brine (800 ml) is added to each pot and carbon dioxide gas bubbled into the system whilst heating to 80° C. After oxygen has been removed (e.g. half an hour at 80° C.), cylindrical mild steel probes are inserted into the hot brine and kerosene (200 ml) carefully poured on top of the aqueous phase. Other hydrocarbons e.g. crude oil can be used instead of kerosene. If a "sweet" test is required, the system is now sealed. However, for a "sour" test, the equivalent of 50 ppm hydrogen sulphide is now added (in the form of an aqueous 12% sodium sulphide solution) before sealing the vessel and turning off the $CO_2$. Corrosion rate readings (in mpy) are now initiated using a linear polarisation meter and recorder. Readings are then taken throughout the course of an experimental run. After three hours, the rate of corrosion has usually achieved equilibrium and a blank corrosion rate is taken. 10 ppm of corrosion inhibitor (30% actives) is now injected into the hydrocarbon phase of the system to test the water partitioning properties of each chemical. Each test is run for 24 hours. Percentage protection values are calculated at +2 hours and +16 hours after the addition of product.

Some results are given in Table 2.

TABLE 2

| EXAMPLE | COMPOSITION OF ACTIVES | CORROSIVE AGENTS | % PROTECTION +2 HRS | % PROTECTION +16 HRS |
|---|---|---|---|---|
| 1. | Duomeen C - acrylic acid (1 eq.) ampholyte (30%) | sweet sour | 43 70 | 60 84 |
| 2. | Duomeen C - acrylic acid (2 eq.) ampholyte (30%) | sweet sour | 53 46 | 65 69 |
| 3. | Duomeen C - acrylic acid (3 eq.) ampholyte (30%) | sweet sour | 21 66 | 56 90 |
| 4. | Duomeen T - acrylic acid (1 eq.) ampholyte (30%) | sweet sour | 75 93 | 98 97 |
| 5. | Duomeen T - acrylic acid (2 eq.) ampholyte (30%) | sweet sour | 53 21 | 80 34 |
| 6. | Duomeen T - acrylic acid (3 eq.) ampholyte (30%) | sweet sour | 54 79 | 99 96 |

"sweet" indicates saturation with $CO_2$
"sour" indicates saturation with $CO_2$ plus 50 ppm $H_2S$

ECOTOXICITY

The toxicity of the compounds was measured by assessing the concentration of each compound required to kill 50% of the microorganism Tisbe Battagliai. This concentration is termed the LC50 and is expressed in mg/l. The results are given in Table 3.

TABLE 3

SCREENING TEST FOR THE TOXICITY OF CHEMICALS TO TISBE BATTAGLIAI

| SAMPLE IDENTIFICATION | TIME (hrs) | CATEGORY OF LC50 (mg/l) <10 | 10-100 | 100-1000 | <1000 |
|---|---|---|---|---|---|
| Example 1. | 24 48 | | | | |
| Example 2. | 24 48 | | | | |
| Example 3. | 24 48 | | | | |
| Example 4. | 24 48 | | | | |
| Example 5. | 24 48 | | | | |
| Example 6. | 24 48 | | | | |

Growth inhibition tests have also been carried out to assess the impact of the compounds on the, marine algae Skeletonema Costatum. This is a test which is becoming required by some offshore authorities, and is therefore of particular interest when considering the practical applications of the compounds.

MARINE PHYTOPLANKON-INHIBITION OF GROWTH RATE

TEST CONDITIONS

Test organisms: Skeletonema costatum (Greville) Cleve, Clone Skel-5.
Incubation: 3 days at 14° C., in light/darkness cycles of 14 hrs/10 hrs.
pH-tolerance: 7.5-9.2.
Test samples: Aliquots of each sample are weighed into phytoplankton medium and extracted; moderate shaking for 20 hrs at 14° C.
Control compound: Na-dodecyl-sulphate. Normally a concentration of 1.3 mg/kg gives 30 to 70% of normal growth rate. Measured in this test: 30% to 55%.

RESULTS

Results were calculated as the concentration of compound required to inhibit 50% growth of algae during three days of exposure, termed $EC_{50}$, given in mg/kg (ppm). The interval EC20 to EC80 is also given. The results are presented in Table 4.

TABLE 4

INHIBITION OF GROWTH RATE OF ALGAE SKELETONEMA COSTATUM

| SAMPLE | $EC_{20}$ | $EC_{50}$ | $EC_{80}$ |
|---|---|---|---|
| Example 4. | 0.30 | 0.45 | 0.63 |
| Example 5. | 1.26 | 2.00 | 2.82 |
| Example 6. | 1.88 | 3.16 | 4.47 |

It can be seen from this that the compounds containing secondary and tertiary amines are much less ecotoxic than those which contain a significant proportion of primary amines.

What is claimed is:

1. A method of inhibiting corrosion of metals by a liquid which comprises introducing into the liquid corrosion inhibiting amounts of an amine having the following formula:

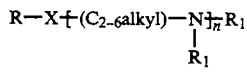

where:
- R is a $C_{6-20}$ straight or branched hydrocarbon group;
- X is $NR_1$ or O;
- each $R_1$ is independent and selected from the group consisting of H, $(CH_2)_{1-4}COOH$ group, and a $C_{6-20}$ hydrocarbon group; n is 1, 2 or 3;
- and wherein the amine contains at least one $(CH_2)_{1-4}$ COOH group or salt thereof, said amine being substantially free of primary amine groups.

2. The method of claim 1 in which each amino group in the amine is tertiary.

3. The method of claim 1 wherein n is 1.

4. The method of claim 1 wherein each $R_1$ is $-(CH_2)_2 COOH$.

5. The method of claim 1 the R is the hydrocarbon residue of a naturally occurring fatty acid.

6. The method of claim 5 wherein the hydrocarbon residue of a naturally occurring fatty acid is hydrogenated.

7. The method of claim 1 wherein R is a residue of an acid found in coconut oil or tallow oil.

8. The method of claim 1 wherein the amine is present in the form of an ammonium, alkali metal or alkaline earth metal salt.

9. The method of claim 1 wherein the concentration of the corrosion inhibitor introduced into the liquid ranges from 1 to 1000 ppm.

10. The method of claim 9 wherein the liquid is an oil field fluid containing water and further comprising the step of separating the water from the liquid containing the corrosion inhibitor and disposing of the water into a marine or freshwater environment.

11. The method of claim 1 where X is $NR_1$ and each $R_1$ is a $(CH_2)_{1-4}$ COOH group.

12. A method of inhibiting corrosion of metals by oil well fluid containing water which comprises
   (a) introducing into the fluid corrosion inhibiting amounts of an amine having the following formula:

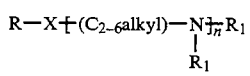

where:
X is $NR_1$ or O,
R is a residue of tallow oil, and each $R_1$ is independently a $(CH_2)_{1-4}$ COOH group, n is 1, 2, or 3;
   (b) contacting metal with the fluids containing the amine; and
   (c) thereafter disposing of at least portions of the water having portions of the amine dissolved or dispersed therein into marine or freshwater environments.

* * * * *